US006758164B2

(12) United States Patent
Rich

(10) Patent No.: US 6,758,164 B2
(45) Date of Patent: Jul. 6, 2004

(54) BIRD FEEDER WITH REMOVABLE BIRD SEED RESERVOIR

(75) Inventor: Christopher T. Rich, Lancaster, PA (US)

(73) Assignee: Woodstream Corporation, Lititz, PA (US)

(*) Notice: Subject to any disclaimer, the term of this patent is extended or adjusted under 35 U.S.C. 154(b) by 123 days.

(21) Appl. No.: 10/074,032

(22) Filed: Feb. 14, 2002

(65) Prior Publication Data

US 2003/0150391 A1 Aug. 14, 2003

(51) Int. Cl.[7] .............................................. A01K 39/01
(52) U.S. Cl. ................................... 119/52.3; 119/57.9
(58) Field of Search .............................. 119/57.8, 52.2, 119/72, 52.3, 57.9, 124

(56) References Cited

U.S. PATENT DOCUMENTS

| 2,618,238 | A | * | 11/1952 | Travis | 119/52.1 |
|---|---|---|---|---|---|
| 3,568,641 | A | * | 3/1971 | Kilham | 119/57.8 |
| 4,434,745 | A | * | 3/1984 | Perkins et al. | 119/57.9 |
| 5,016,573 | A | * | 5/1991 | Power | 119/57.9 |
| 5,111,772 | A | * | 5/1992 | Lipton | 119/57.9 |
| D351,262 | S | * | 10/1994 | Fasino | D30/127 |
| D351,691 | S | * | 10/1994 | Lipton | D30/127 |
| 6,067,934 | A | * | 5/2000 | Harwich | 119/57.8 |
| 6,253,707 | B1 | * | 7/2001 | Cote | 119/57.9 |
| D448,126 | S | * | 9/2001 | Colwell | D30/124 |
| 6,453,843 | B2 | * | 9/2002 | Bescherer | 119/51.01 |

FOREIGN PATENT DOCUMENTS

GB      2275408     * 8/1994 .......... A01K/39/01

OTHER PUBLICATIONS

Gardensong Feeders, Coach Lamp Bird Feeder No. 469–9 and Carriage Lamp Bird Feeder No. 470–6, p. 11.
Terra Cotta, Bird Feeders No. 4101–4 and 4106–4, p. 14.
Top Flight Lifetime Feeders, Fortress Triple Tube Bird Feeder No. 5124–2, Bird Feeder No. 5101–4 and Finch Feeder No. 5102–4, 5108.
Top Flight Lifetime Feeders, Fortress Squirrel Proof Bird Feeder, 5108, 1997.

* cited by examiner

Primary Examiner—Son T. Nguyen
(74) Attorney, Agent, or Firm—Jacobson Holman PLLC

(57) ABSTRACT

A bird feeder wherein a hopper is carried by a housing, such as a wire cage, with a hanger attaching the housing to a support for the bird feeder, the hopper being removably secured to the base of the housing so that the base and hopper assembly can be separated from the remainder of the housing to refill and/or clean the hopper without removing the hanger from its support. The hopper can be separated from the base, as well, to facilitate cleaning.

9 Claims, 10 Drawing Sheets

US 6,758,164 B2

BIRD FEEDER WITH REMOVABLE BIRD SEED RESERVOIR

BACKGROUND OF THE INVENTION

1. Field of the Invention

This invention relates to bird feeders and relates more particularly to the type of bird feeder which comprises a housing with a hopper carried by the housing for receipt of bird food, and a hanger for attaching the housing to a support for the bird feeder, such as a hook, a tree limb, or the like. Commonly, the hopper for bird feeders of this type comprise a cylindrical transparent plastic tube with a multiplicity of feed ports or openings intermediate the top and bottom portions of the tube. Oftentimes, the housing is a wire cage surrounding the hopper to minimize access to the feed port by squirrels and other small animals that tend to frighten off birds, quickly deplete the supply of bird food, and even destroy the hopper to access the bird food.

The wire cage may be provided with a metal base or tray and a metal cap or cover to complete the housing, and a wire loop or the like may be attached to the cover for supporting the bird feeder in use. The cover may be removable to enable access to the hopper for refilling and/or cleaning the same.

2. Description of the Related Art

Commercially available bird feeders of this type have several disadvantages. First, in order to refill and/or clean the hopper, it is necessary to remove the entire bird feeder from its support. When the hopper has been refilled, the bird feeder may be quite heavy, such that rehanging the same, particularly from a tree limb or other support with limited access, is burdensome, especially for small adults or children. Further, while the plastic hopper may be removable from the housing for cleaning, this too requires displacing the entire bird feeder. Moreover, removing the hopper from the cage and replacing the same is difficult and time consuming with prior art bird feeders and, in some instances, requires extraneous tools such as screw drivers or the like.

SUMMARY OF THE INVENTION

With the foregoing in mind, it is a primary object of this invention to provide a bird feeder which overcomes the aforementioned disadvantages in a simple and inexpensive manner. More specifically, the instant invention is directed to a bird feeder wherein the hopper is removable from the housing to refill and/or clean the hopper without requiring the hanger to be removed from its support.

A further object of this invention is the provision of a bird feeder wherein the principal portions of the housing, most preferably a wire cage, and its associated cover and hanger, are removably secured to the base, with the hopper carried by the base inside the cage for removal from the cage with the base. In this manner, the hanger carrying the cover and wire cage can remain on its support, with the hopper being removed from the bottom of the wire cage to be refilled apart from the wire cage. Once the hopper has been refilled, it can be slid back into the cage from the bottom, and the base re-attached to the cage to complete the assembly. This avoids the need to disengage the hanger from its support for refilling and/or cleaning of the hopper, and then re-engaging the same after filling, and also minimizes the height to which the hopper must be lifted after it has been refilled.

Another important object of this invention is to provide a bird feeder of the type described wherein the hopper is removably secured to the base to enable the hopper to be totally separated from all of the housing components for cleaning and/or replacement in the event of damage.

Consistent with the foregoing objects, the instant invention provides a bird feeder wherein the base carrying the hopper is removable from the wire cage without the intervention of extraneous tools and, likewise, the hopper is removable from the base in the same manner. In the preferred embodiments, bayonet connections or the like are provided between the wire cage and the base and between the bottom of the hopper and the base so that separation and reconnection can be easily and quickly effected.

A still further object of this invention is the provision of a unique connection between the base and the wire cage which, once engaged, effectively locks the base to the wire cage under the influence of gravity.

BRIEF DESCRIPTION OF THE DRAWINGS

These and other objects, features and many of the attendant advantages of the invention will be better understood upon a reading of the following detailed description when considered in connection with the accompanying drawings, wherein like parts in each of the several figures are identified by the same reference numerals, and wherein.

Like reference characters refer to like parts throughout the several views of the drawings.

DETAILED DESCRIPTION OF THE PREFERRED EMBODIMENTS

Figure 1:
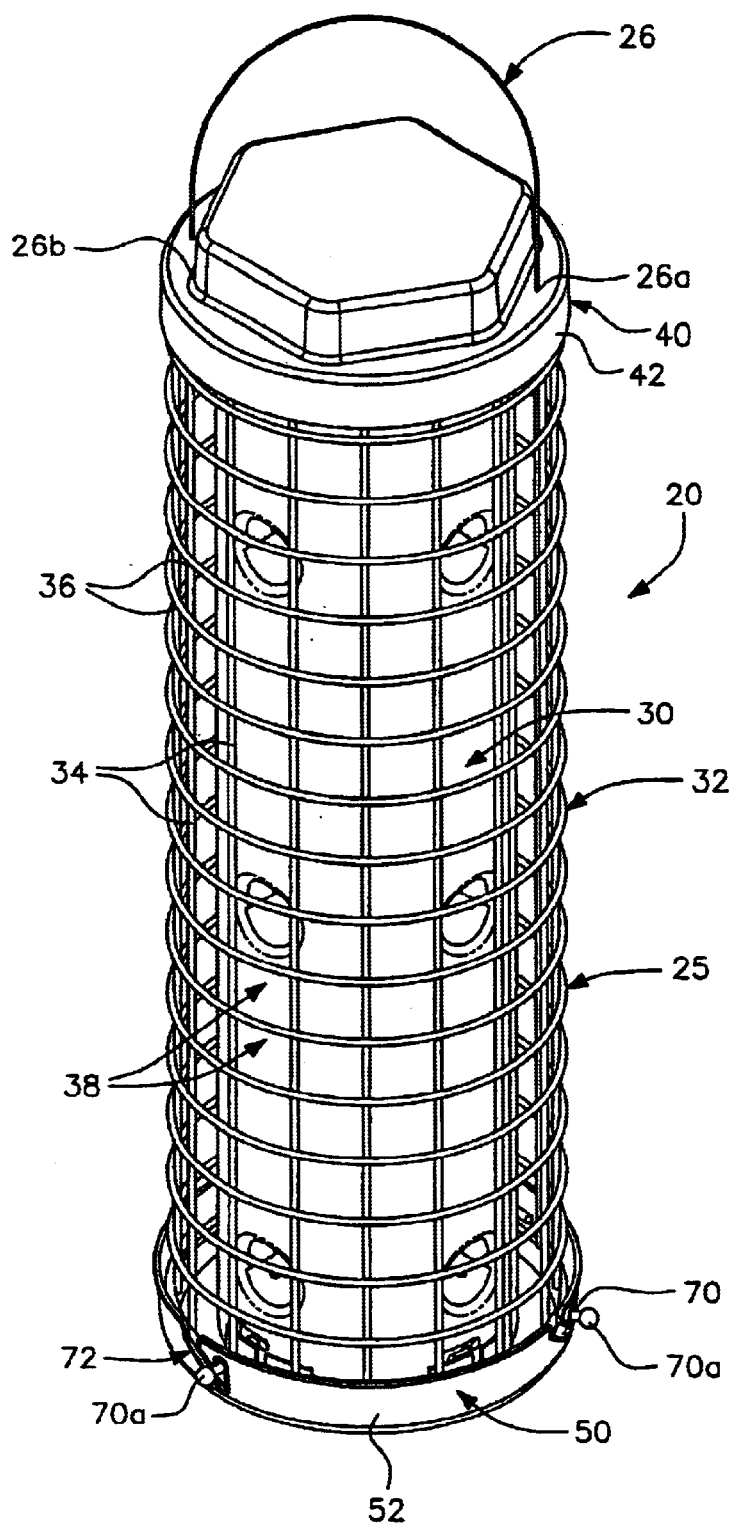
FIG. 1 is a perspective view of a preferred embodiment of a fully assembled bird feeder according to the instant invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
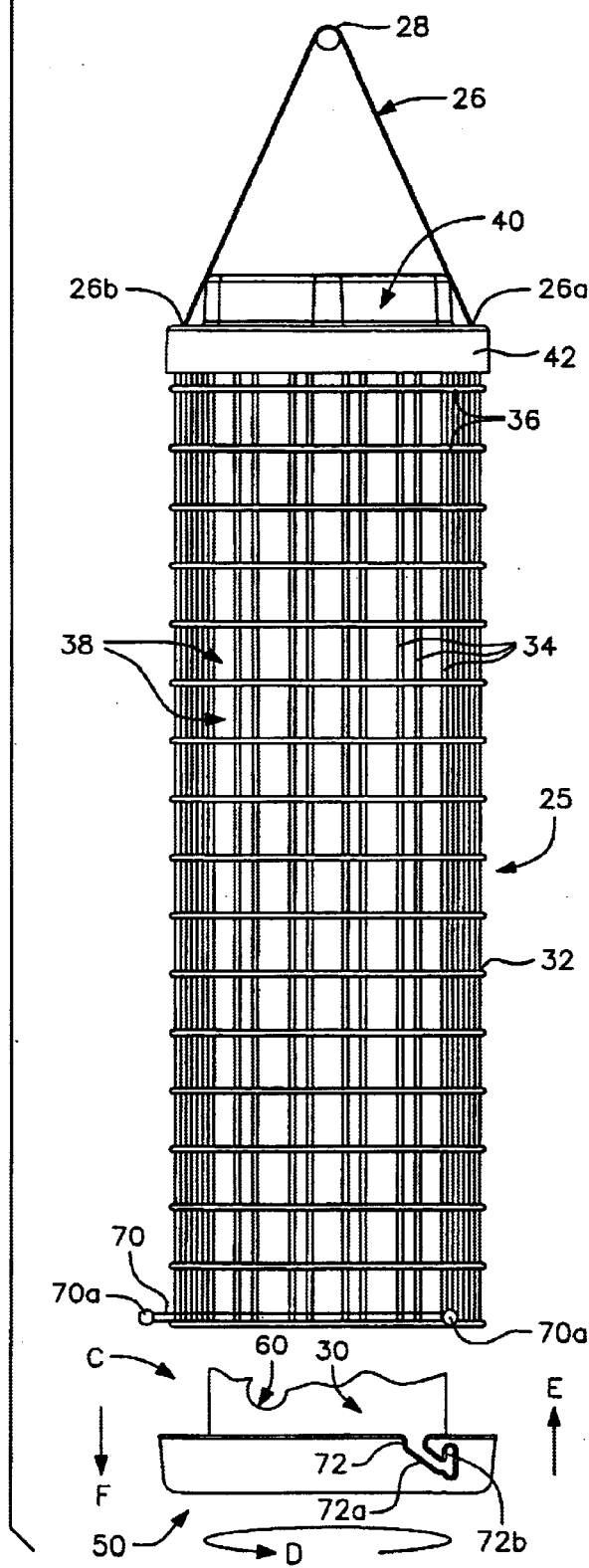
FIG. 2 is an exploded view, partially broken away for illustrative clarity, showing the manner in which the hopper, carried by the base, is removably secured to the wire cage.

Referring now to the drawings, a preferred embodiment of a bird feeder according to the instant inventive concepts is designated generally by the reference numeral 20, and comprises basically a housing 25, a hopper 30 carried by the housing for receipt of a quantity of bird food (not shown), and a hanger 26 for attaching the bird feeder to a support schematically shown at 28 in FIG. 2, which could be a hook, a branch of a tree, or the like.

The housing 25 can be of any size and shape and can be formed of any desired material, but preferably is an elongated cylindrical cage 32 made up of a series of vertically extending, horizontally spaced, parallel wire elements 34 interconnected, as by welding or the like, to a series of vertically spaced, horizontally extending, wire hoops 36 to define a multiplicity of apertures 38 therebetween. See, particularly, FIGS. 1–3 and 6–8. The wire cage 32 is a well known protective housing designed to preclude access to the bird food and damage to the housing by squirrels and other small animals, and, to that end, the wire elements 34, 36 can be coated with any conventional chew and rust resistant coating, if desired.

Figure 3:
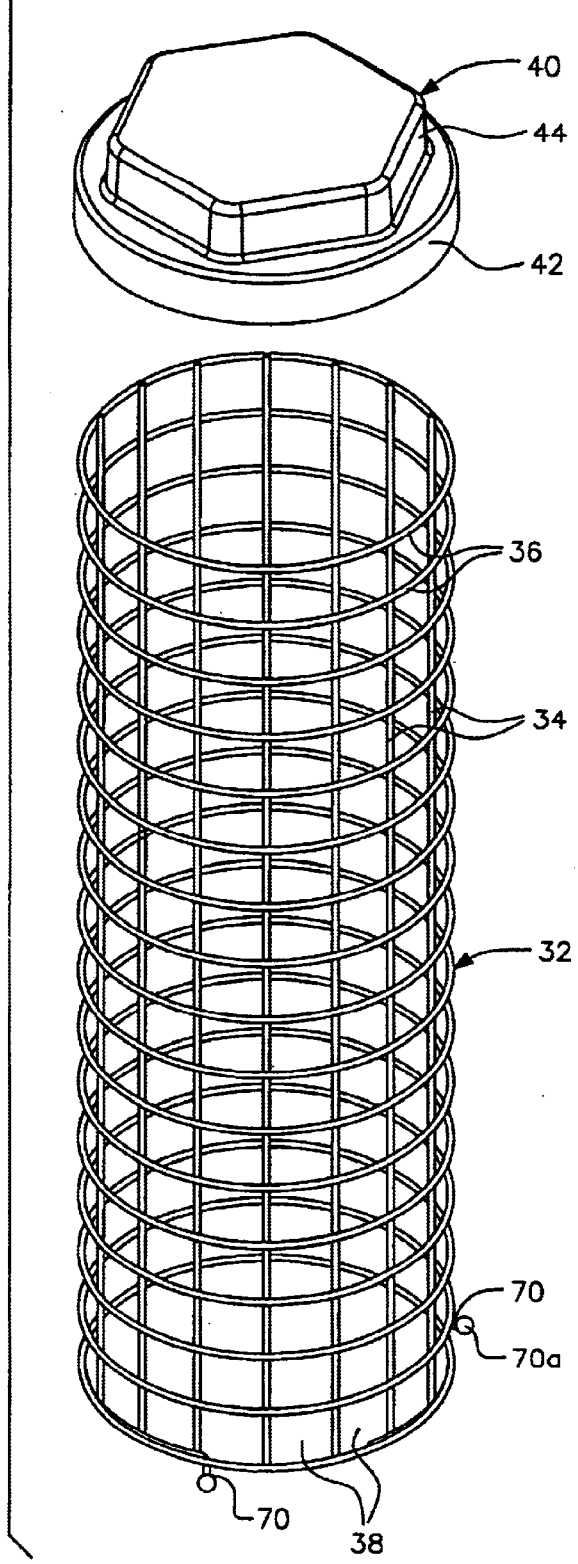
FIG. 3 is an exploded perspective view of the wire cage and cover therefor, hidden parts being shown in dotted lines.
Figure 4:
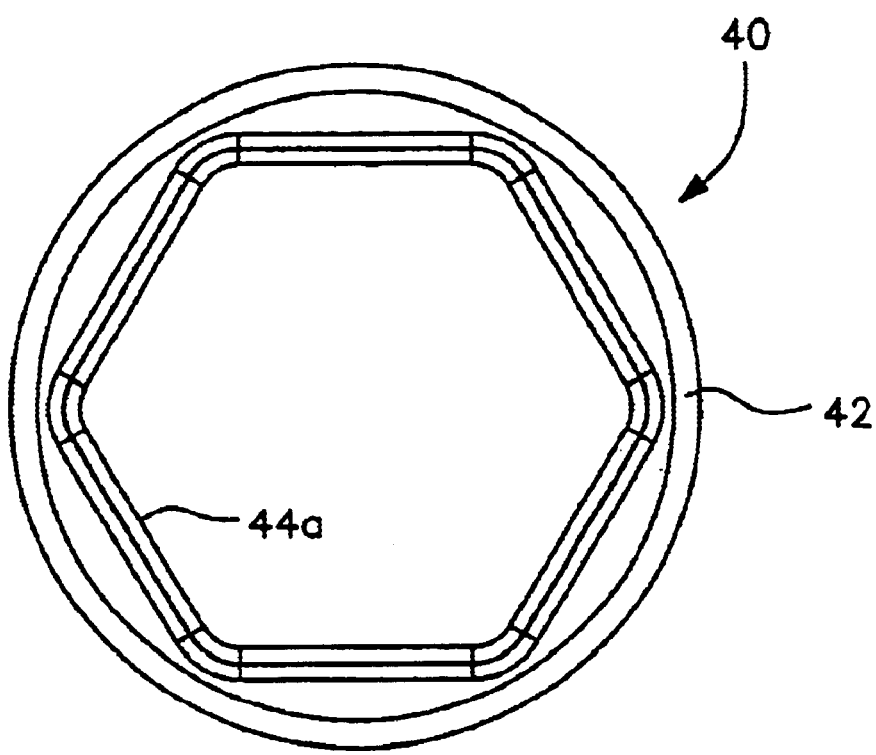
FIG. 4 is a bottom plan view of the cover.
Figure 5:
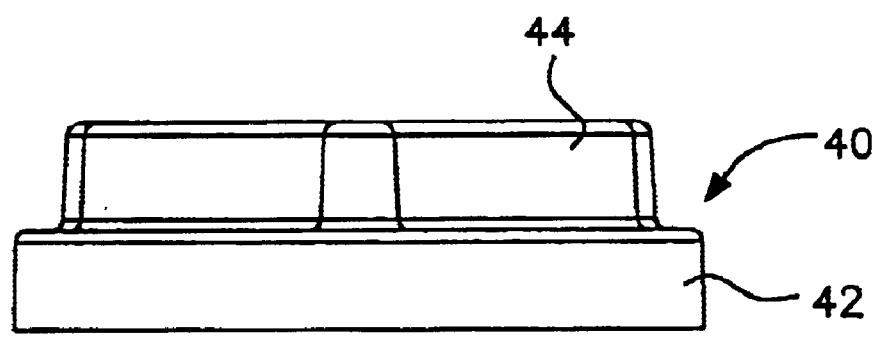
FIG. 5 is a side elevational view of the cover.
Figure 6:
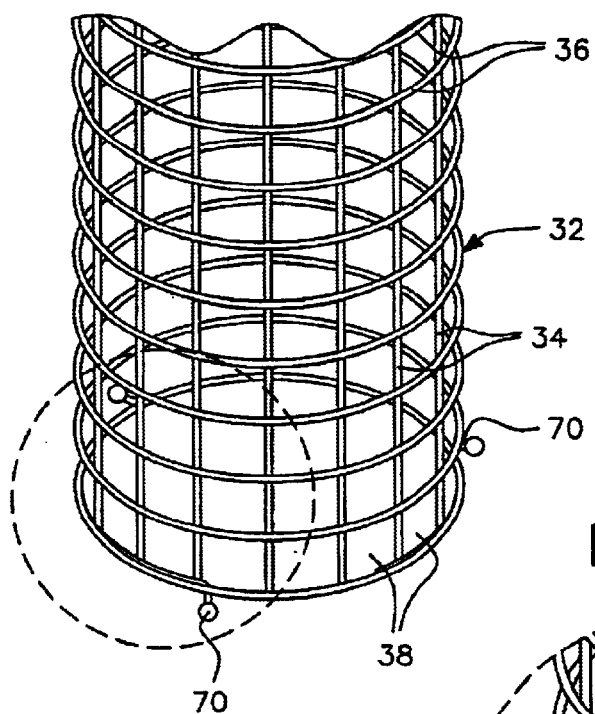
FIG. 6 is a perspective view, partially broken away of the lower portions of the wire cage.
Figure 7:
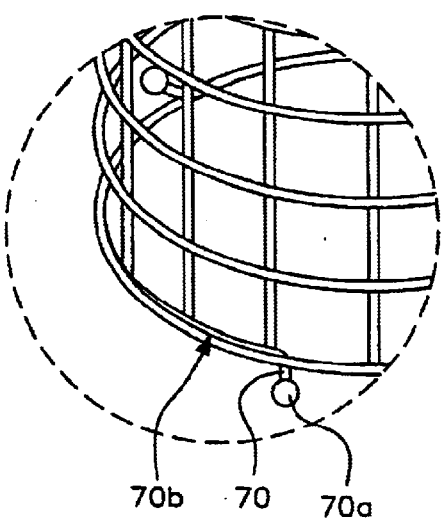
FIG. 7 is an enlarged detail showing of the portion of the wire cage circled in dotted lines in FIG. 6.
Figure 8:
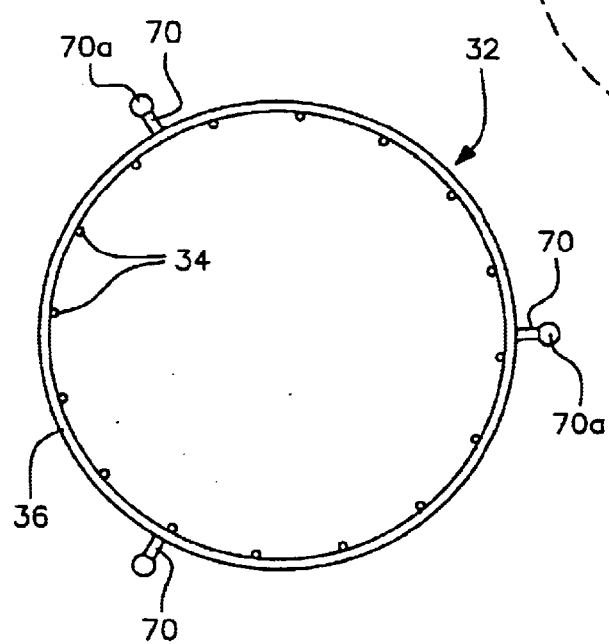
FIG. 8 is a top plan view of the wire cage.
Figure 9:
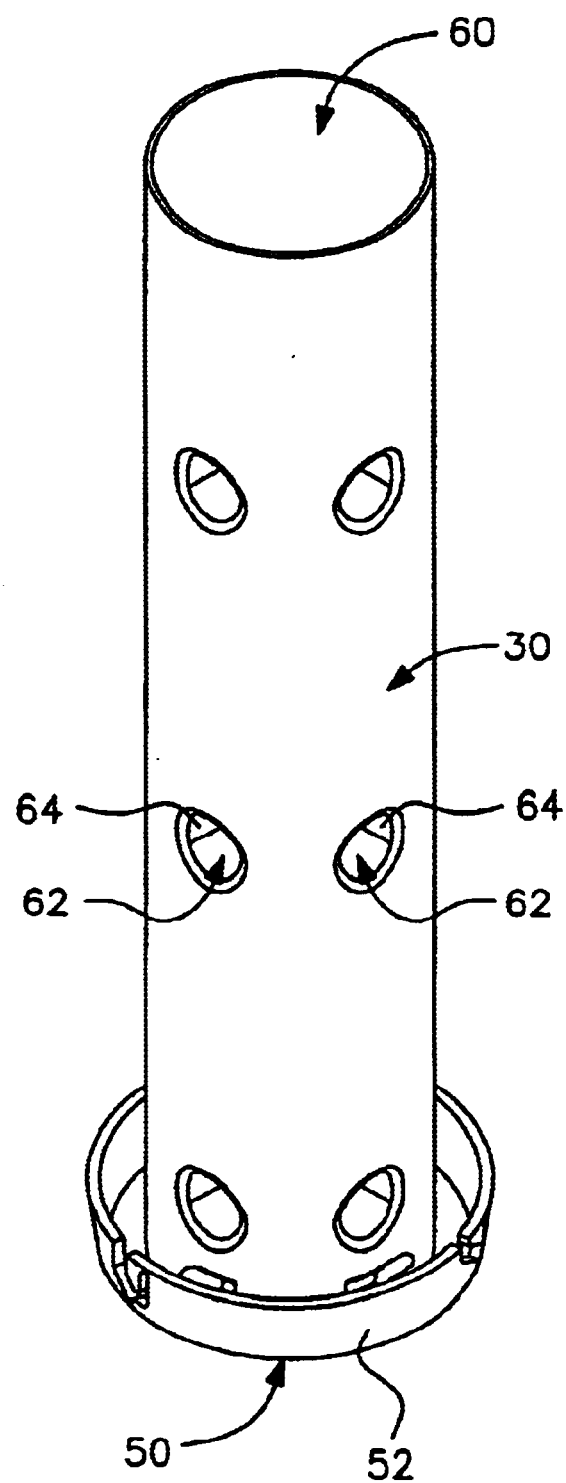
FIG. 9 is a perspective view of the bird feeder hopper carried by the housing base.

In addition to the cage 32, the housing 25 includes a cap or cover 40 seen particularly in FIGS. 3–5, which may be similarly coated with a rust resistant material or the like. The cover 40 includes a downwardly depending peripheral flange 42 fitted about the top portions of the wire cage 32, and preferably fixedly secured thereto as by welding or the like. A raised portion 44 of the cover 40 defines an internal flange 44a to assist in centering the top portion of the hopper 30 in a manner to be discussed in more detail hereinafter.

The hanger 26 can take any conventional form, preferably being a flexible wire loop, the ends 26a, 26b of which are attached to the cover in any conventional manner to enable the hanger to fit over supports of different dimensions such as a hook, a tree branch, or the like as seen at 28 in FIG. 2.

Finally, the housing 25 includes a base 50, seen particularly in FIGS. 1, 2, 9, 10 and 13–17. The base 50 may be coated with a rust resistant material or the like and includes an upstanding peripheral flange 52 adapted to slide over the bottom portions of the wire cage 32 for removable attachment thereto in a manner and for a purpose to be described hereinafter. Spaced inwardly of the peripheral flange 52, an upstanding central portion defining an internal flange 54 which fits within the lower portions of the hopper 30, and is removably secured thereto in a manner and for a purpose to also be described hereinafter. Spanning the upper edges of the internal flange 54 is an element 56 which underlies the bottom portions of the hopper 30 and forms a floor therefor when the hopper 30 is seated on the base 50. Drain apertures shown illustratively at 58 may be provided as necessary in any portion of the base 50 to avoid the retention of water when rain or the spray from a sprinkler enters the bird feeder.

The hopper 30 can also be of any shape or size, and can be formed of any desired material, but is preferably an elongated cylindrical element formed of a transparent polymeric material, such as polypropylene or the like. See FIGS. 1, 2 and 9–11. The hopper 30 defines an internal cavity 36 for receipt of the bird food, and includes a plurality of spaced feed ports 62 which are aligned with at least some of the apertures 38 in the wire cage 32 to enable birds to access the bird food within the cavity 60 in a well known manner.

Each of the feed ports 62 may include an internally extending semicircular cap 64 adapted to preclude outflow of bird food from the cavity 60 in a well known manner. The caps 64 may be adhesively secured or snappingly engaged in the feed ports 62 as independent elements as is common in the prior art, or alternatively and preferably, may be integrally formed in the hopper 30 as described in co-pending, commonly assigned, application Ser. No. 10/073,951 filed simultaneously herewith and entitled "Method of Making a Tubular Element and Product, Particularly Bird Feeder Hopper, Produced Thereby", the subject matter of which is incorporated herein in its entirety by reference.

The hopper 30 is preferably open at both the bottom and the top, the bottom portions being slid over the internal flange 52 of the base 50 to provide the hopper 30 with a floor 56, with the upper portions of the hopper 30 being centered in the housing by the internal flange 44 of the cover 40. Although the hopper 30 can be permanently affixed to the base 50 within the broader concepts of this invention, it is preferably removably affixed thereto so that the hopper 30 can be totally removed from the housing 25 to facilitate cleaning. To effect that result, a plurality of pins 65 extend outwardly from the upper portions of the internal flange 54 in the base 50 at radially spaced locations, three such pins being shown as illustrative. A complementary number of slots 66 are defined in the bottom portions of the hopper 30 to removably connect the hopper to the base by slidingly engaging the slots 66 over the pins 65. Preferably, the slots 66 are inverted L-shaped slots, each of which has a first part 66a extending upwardly from a lower edge of the hopper 30, and a second part 66b laterally offset from the upper end of the first part 66a, whereby the first part 66a of the slots 66 can be slid downwardly over the pins 65 in the direction of the arrow A seen in FIG. 10, and then the hopper 30 can be twisted relative to the base 50 in the direction of the arrow B to engage the pins 65 in the second parts 66b of the slots 66 to preclude accidental disengagement of the hopper 30 from the base 50. Obviously, disengagement of the hopper 30 from the base 50 for cleaning and the like can be effected by reversing the foregoing process, that is, rotating the hopper in the direction opposite to the arrow B to move the pins 65 along the lateral portions 66b of the slots 66, and then lifting the hopper 30 in the direction opposite to the arrow A to withdraw the pins 65 free of the first parts 66a of the slots 66, and thus to totally separate the hopper 30 from the base 50.

If desired, further flange elements 68 may be spaced from the internal flange 54 of the base 50 on opposite sides of the pins 65 to better secure and position the lower portions of the hopper 30 on the base 50.

Once the hopper 30 has been attached to the base 50, the internal cavity 60 can be filled with bird food through the open top. The assembly can then be connected to the remainder of the housing 25 by inserting the hopper 30 into the wire cage 32 from below and connecting the base 50 to the lower portions of the wire cage 32. This can be done even if the hanger 26 is still attached to the support 28.

To removably connect the wire cage 32 to the base 50, the lower portions of the wire cage are provided with a plurality of radially spaced outstanding fingers 70, three such fingers being shown as illustrative. If desired, the fingers 70 can each be provided with an enlarged knob 70a at its end. Each of the fingers 70 can be formed as extensions of an arcuate wire 70b welded or otherwise attached to the lower edges of the wire cage 32. See FIG. 7.

Complementary grooves 72 are provided in the peripheral flange 52 of the base 50 to removably secure the cage 32 to the base 50 by slidingly engaging the fingers 70 in the grooves 72. Preferably, the grooves 72 each include a first part 72a extending downwardly at an angle from the upper edge of the peripheral flange 52, and a second part 72b extending upwardly from the end of the first part 72a. In this manner, the fingers 70 can be slid downwardly along the angular first parts 72a of the grooves 72 in the direction of the arrow C seen in FIG. 2 as the cage 32 is rotated in the direction of the arrow D, and then will slide upwardly into the second parts 72b of the grooves 70 in the direction of the arrow E under the influence of gravity, pulling the base 50 downwardly in the direction of the arrow F.

The use and operation of the bird feeder of this invention will now be clear to those with ordinary skill in the art. With the hopper full and the elements fully assembled, the bird feeder 20 can be hung on any support element 28 by the hanger 26 in a conventional manner. Birds can access food within the internal cavity 60 of the hopper 30 through the apertures 38 of the cage 32 and the feed ports 62 of the hopper 30. The transparent nature of the hopper 30 enables visual recognition that the hopper needs refilling. At that time, the base 50 carrying the hopper 30 can be lifted relative to the cage 32 in the direction of the arrow E to move the pins 70 downwardly along the parts 72b of the grooves 72, and the base 50 can then be rotated in a direction opposite to the arrow D to slide the pins 70 along the parts 72a of the grooves 72 so that the base 50 with the hopper 30 carried thereby can be withdrawn downwardly in the direction of the arrow F to separate the same from the cage 32 without removing the cage 32, cover 40 and hanger 26 from the support 28.

Figure 10:
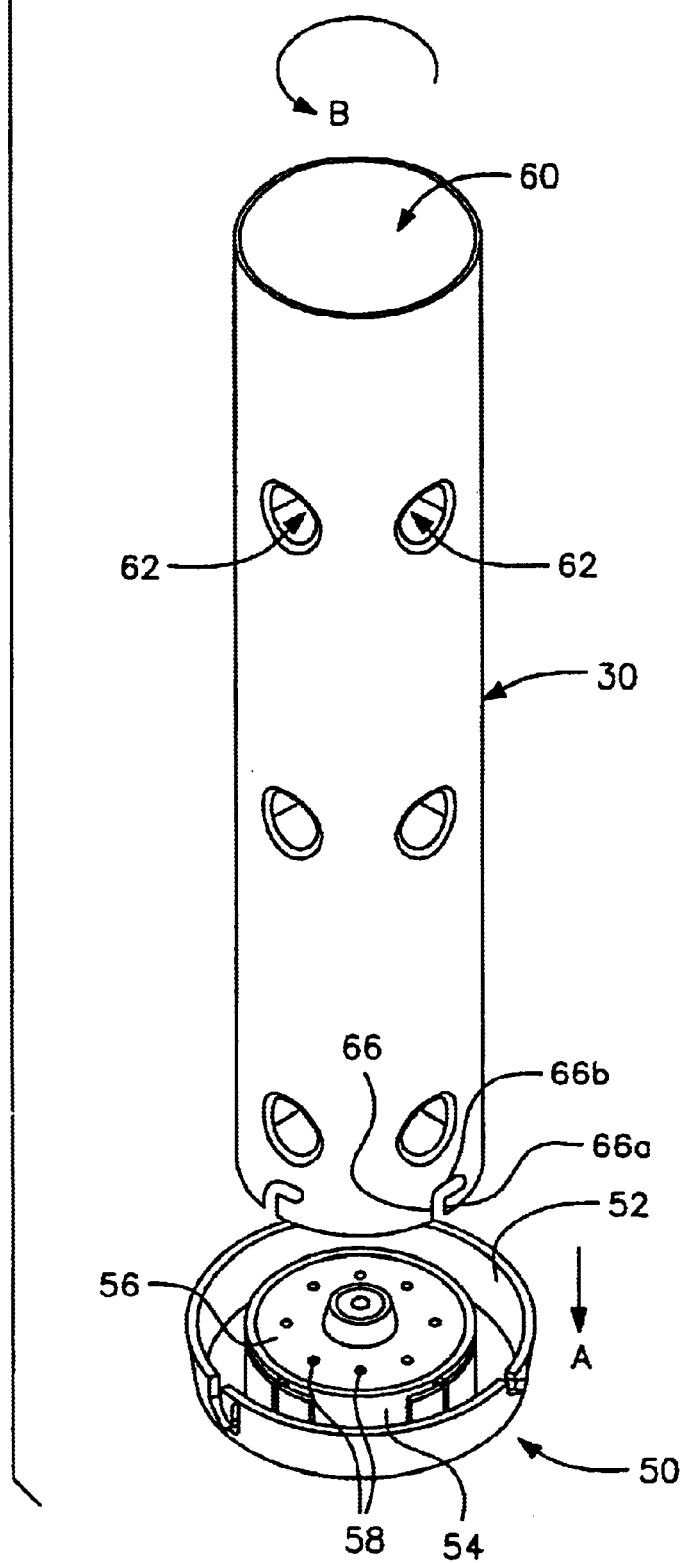
FIG. 10 is an exploded view showing the manner in which the hopper is removably secured to the housing base.
Figure 11:
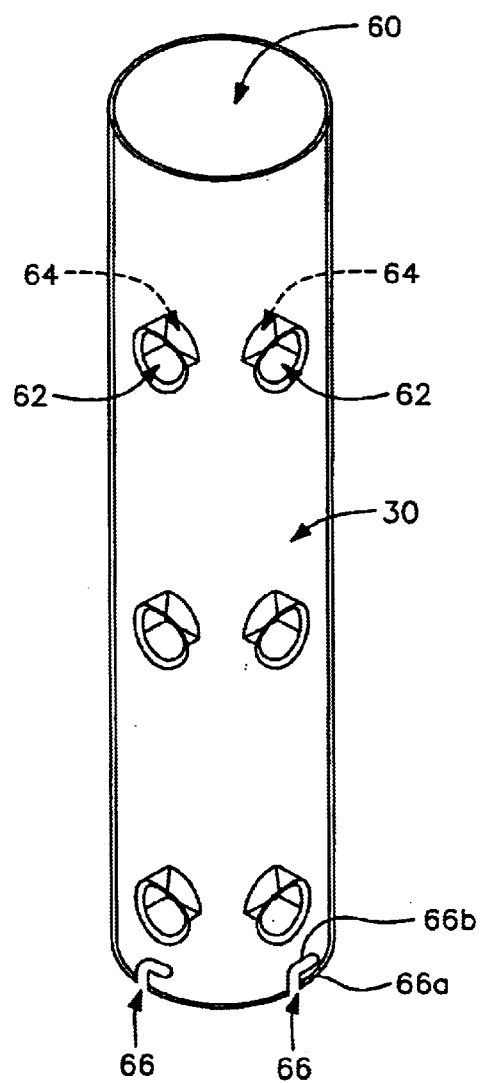
FIG. 11 is a prospective view of the hopper itself showing the semicircular caps internally of the feed ports in dotted lines.
Figure 12:
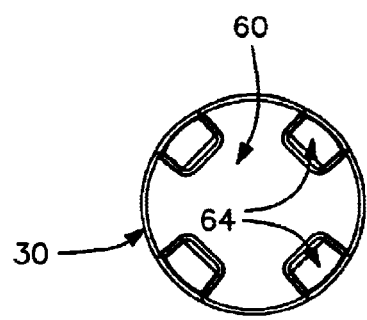
FIG. 12 is a top plan view of the hopper.
Figure 13:
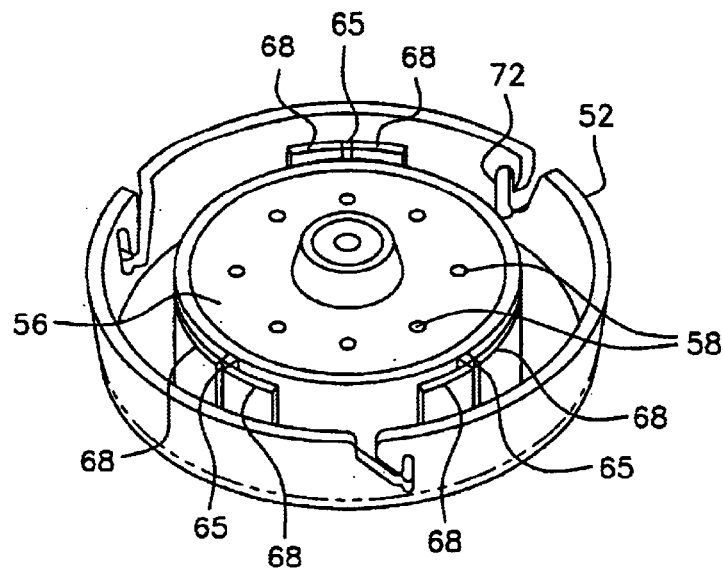
FIG. 13 is a perspective view of the base of the bird feeder housing.
Figure 14:
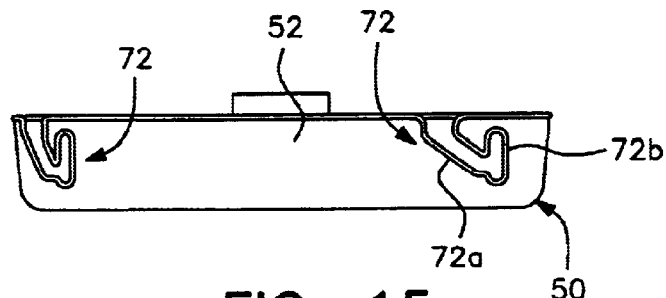
FIG. 14 is a side elevational view of the base.
Figure 15:
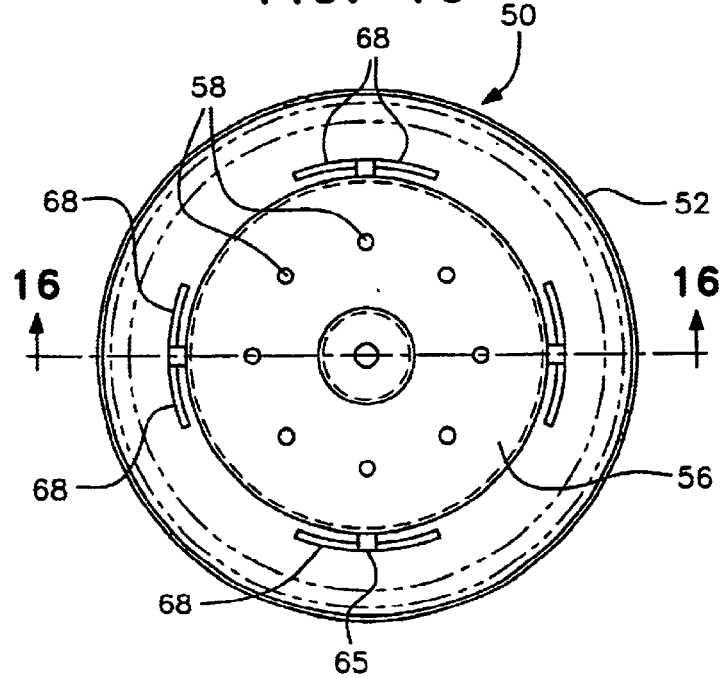
FIG. 15 is a top plan view of the base.
Figure 16:
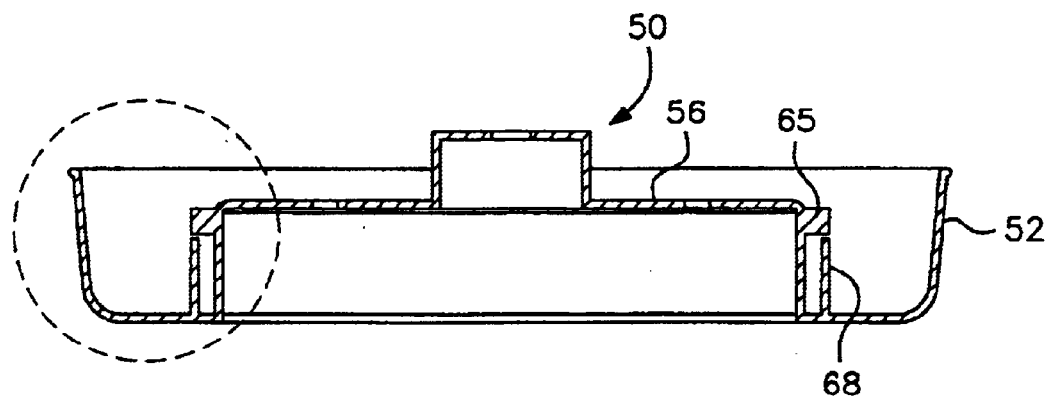
FIG. 16 is a transverse cross-sectional view of the base taken along lines 16—16 of FIG. 15.
Figure 17:
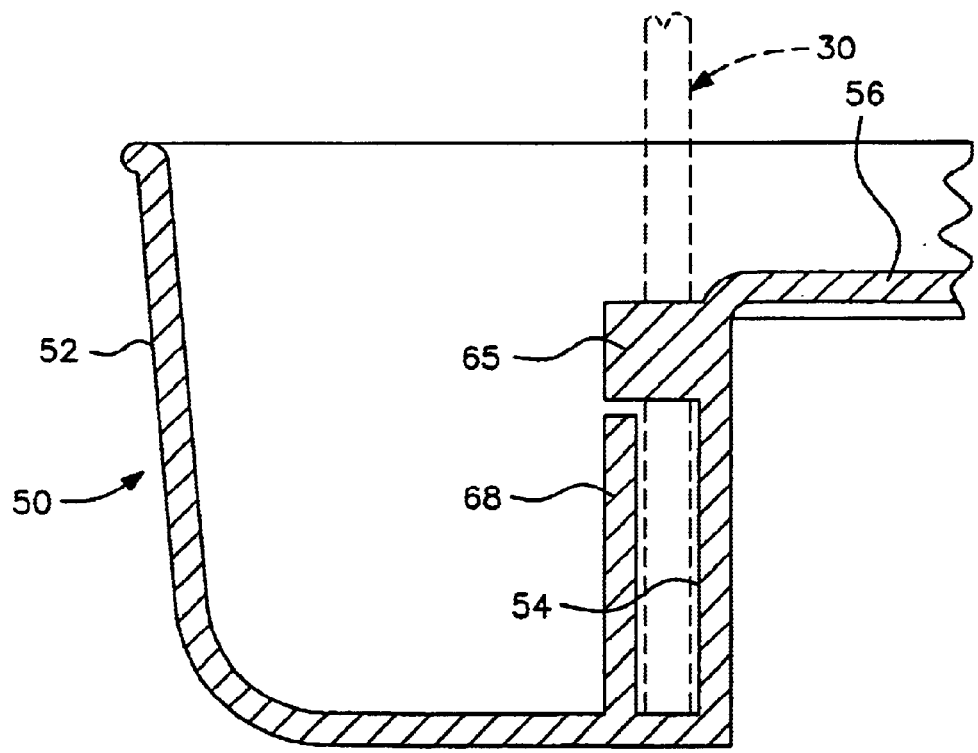
FIG. 17 is an enlarged detail showing of the portion of the base circled in dotted lines in FIG. 16, with a fragmentary portion of the hopper being shown in dotted lines as it would be engaged with the base.

If desired, the hopper 30 can be removed from the base 50 to facilitate cleaning of the hopper 30 or the like by rotating the base 50 in the direction of the arrow B in FIG. 10 to slide the pins 65 along the lateral portions 66b of the slots 66, with the base 50 then lowered in the direction of the arrow A to permit the pins 65 to slide downwardly along the parts 66a of the slots 66 to free these elements from each other.

With these parts re-assembled, the internal cavity 60 of the hopper 30 can then be filled from above, and the hopper slid upwardly into the wire cage to re-engage the fingers 70 in the grooves 72 as described above, with the fingers 70 sliding upwardly into the parts 72b of the grooves 72 under the weight of the assembly of the base 50 and hopper 30 to secure the base 50 to the cage 32.

As suggested above, the materials from which the individual elements are fabricated can vary, as can the size and shape of the elements to accommodate particular applications of the bird feeder of this invention. While the mechanisms for attaching the hopper 30 to the base 50 and the base 50 to the wire cage 32 illustrated herein are preferred, other techniques for interengaging these elements will be obvious to those with ordinary skill in the art.

The foregoing descriptions and drawings should be considered as illustrative only of the principles of the invention. Numerous applications of the present invention will readily occur to those skilled in the art. Therefore, it is not desired to limit the invention to the preferred embodiments or the exact construction and operation shown and described. Rather, all suitable modifications and equivalents may be resorted to, falling within the scope of the invention.

What is claimed is:

1. A bird feeder comprising a housing, a hopper carried by said housing for receipt of bird food, and a hangar for attaching said housing to a support for the bird feeder, said housing comprising a wire cage having top portions and bottom portions and defining a multiplicity of apertures, a cover secured to said top portion of said cage, and said hangar secured to said cover, said housing further including a base removably secured to said bottom portions of said cage, said hopper being carried by said base inside said cage for removal from said cage with said base and including open top and bottom portions and defining an internal cavity for receipt of the bird food, a plurality of spaced feed ports in said hopper intermediate said top and bottom portions, said feed ports communicating with said internal cavity of said hopper, and selected apertures in said cage being aligned with said feed ports, portions of said base defining an upwardly extending internal flange, a floor element surrounding and extending outwardly from the bottom of said internal flange, and an external flange extending upwardly from the outer periphery of said floor element, said bottom portions of said hopper being seated over said internal flange of said base, a plurality of pins extending outwardly at spaced locations about said internal flange, and complementary slots defined in said bottom portions of said hopper to removably connect said hopper to said base by slidingly engaging said slots over said pins, a plurality of fingers extending outwardly about said bottom portion of said cage, and complementary grooves defined in said external flange of said base to removably secure said cage to said base by slidingly engaging said fingers in said grooves, said grooves defined in said external flange of said base each including a first part extending downwardly at an angle from an upper edge of said peripheral flange, and a second part extending upwardly from the end of said first part, whereby said fingers can be slid downwardly along said first part of said grooves and will slide upwardly into said second parts of said grooves under the influence of gravity pulling said base downwardly.

2. The bird feeder of claim 1, wherein each of said feed ports include a semicircular cap extending into said internal cavity of said hopper.

3. The bird feeder of claim 2, wherein said hopper is made of plastic.

4. The bird feeder of claim 3, wherein said hopper is transparent.

5. The bird feeder of claim 4, wherein said hopper is tubular.

6. The bird feeder of claim 5, wherein said hopper is cylindrical.

7. The bird feeder of claim 1, wherein said hanger is a wire loop having opposed ends secured to said cover.

8. The bird feeder of claim 1, wherein said slots defined in said bottom portion of said hopper are inverted L-shaped slots each of which includes a first part extending upwardly from a lower edge of said hopper and a second part laterally offset from the upper end of said first part, whereby said first parts of said slots can be slid downwardly over said pins and then said hopper can be twisted relative to said base to engage said pins in said second parts of said slots.

9. The bird feeder of claim 1, wherein said fingers extending outwardly about said bottom portion of said cage are formed by continuations of wire elements forming said cage.

* * * * *